United States Patent [19]

Unversaw

[11] 4,196,693
[45] Apr. 8, 1980

[54] WATER CLOSETS FOR PET USE

[76] Inventor: A. David Unversaw, 7837 Indigo St., Miramar, Fla. 33023

[21] Appl. No.: 890,400

[22] Filed: Mar. 27, 1978

[51] Int. Cl.² ............................................. A01K 29/00
[52] U.S. Cl. ...................................................... 119/1
[58] Field of Search ........................................... 119/1

[56] References Cited

U.S. PATENT DOCUMENTS

| | | | |
|---|---|---|---|
| 3,871,331 | 3/1975 | Breau | 119/1 |
| 4,011,836 | 3/1977 | Temel | 119/1 |
| 4,050,414 | 9/1977 | Knochel et al. | 119/1 |
| 4,098,229 | 7/1978 | Hayes | 119/1 |

*Primary Examiner*—Jay N. Eskovitz

[57] ABSTRACT

The pet pot is an electrically powered water closet designed for household pets and requiring permanent installation either indoors or outdoors. It has a cover to close the unit when not in use and which acts as a backsplash when the unit is open. It is a low profile unit with a recessed bottom into which an s-trap has been designed and an endless belt conveyor disposed in the housing for supporting a pet and receiving its bodily waste products. The conveyor is mounted to permit waste products deposited on it to fall to the floor of the housing, with at least one water spray pipe located on each end of the conveyor and arranged to direct water sprays to effectively cleanse the conveyor and floor while it is undergoing rotation subsequent to the deposit of waste products thereon, and control devices—both built in for automatic flush and wall mounted for manual flush—to operate the conveyor and initiating the water spray after a timed delay after the pet has left the unit.

2 Claims, 4 Drawing Figures

WATER CLOSETS FOR PET USE

BACKGROUND OF THE INVENTION

This invention relates to pet water closets, particularly of the type which require permanent installation, is connented to a sewage disposal drain, provides an automatic flushing system and a manual flushing device.

It is designed for the exclusive use of household pets, enabling them to dispose of their waste in a sanitary manner, thus eliminating the use of newspapers, sand boxes, self-contained devices, etc., as a waste receptical for home use. It further eliminates the subsequent disposal of the animal waste in trash and garbage containers where it could become a health hazard. It further still eliminates the necessity to walk a pet outside or let him run for the primary purpose of waste disposal. The pet pot has thus been designed in a manner totally safe for the pet, to provide automatic flushing after use and insure complete sanitary disposal of the waste directly into the sewer or septic system.

Other animal water closets which have been previously proposed in recent years such as U.S. Pat. Nos. 4,050,414 and 4,098,229 which are self-contained limiting their usefulness to persons traveling with pets and persons living in trailers or apartments where a permanent type of installation is impractical or impossible. However, when a pet owner has his own home and can accommodate a permanent installation in his home or yard with the waste to be flushed directly into the sewer or septic system, or when the community wishes new housing to include sanitary facilities for pets the above mentioned inventions fail to meet the need.

An attempt to solve the problem is exemplified by U.S. Pat. No. 3,871,331. The inventor successfully accomplished this object in providing a toilet facility for animals which was hygienic and provided environmental protection to the surroundings. The unit, however, includes a housing which completely encloses the animal when and if he can ever be trained to enter for the purpose intended. The housing itself thus becomes the error of this invention.

Another attempt to solve the problem is exemplified by U.S. Pat. No. 4,011,836. The inventor again appears to have successfully accomplished the object of providing a hygienic animal toilet that provides for waste to be properly disposed of directly and automatically into a sewage drain. The inventor has also overcome the objection of U.S. Pat. No. 3,871,331 by providing an open type of housing which is sure to be more attractive to the pet. This unit however, does permit the pet to enter the unit when the floor is open. This is most objectionable and creates other techanical problems resulting in high costs for both the electrical and mechanical systems that cannot be overcome.

The pet pot provides improvement over the aforementioned patents and constitutes a simplified, reliable design for pet water closets.

SUMMARY OF THE INVENTION

It is the primary object of the invention to provide for automatic flushing of animal waste directly into a sewer or septic system, and thus provide a permanent and valuable installation.

It is further the object of the invention to provide a low profile, attractively designed watercloset.

It is another object of the invention to provide a cap which covers and protects the unit when not in use and acts as a backsplash when the unit is open for use.

Yet another object of the invention is to provide a wall mounted control switch for activating the flush manually and also provide a wall mounted control switch to turn the power to the automatic system on and off as needed.

Still another object of the invention provides for the adaptability of the unit for outside installation as well as inside installation.

Further novel features and other objects of the invention will become apparent from the following detailed description, discussion and the appended claims taken in conjunction with the accompanying drawings.

DESCRIPTION OF THE PREFERRED EMBODIMENT

Figure 1:
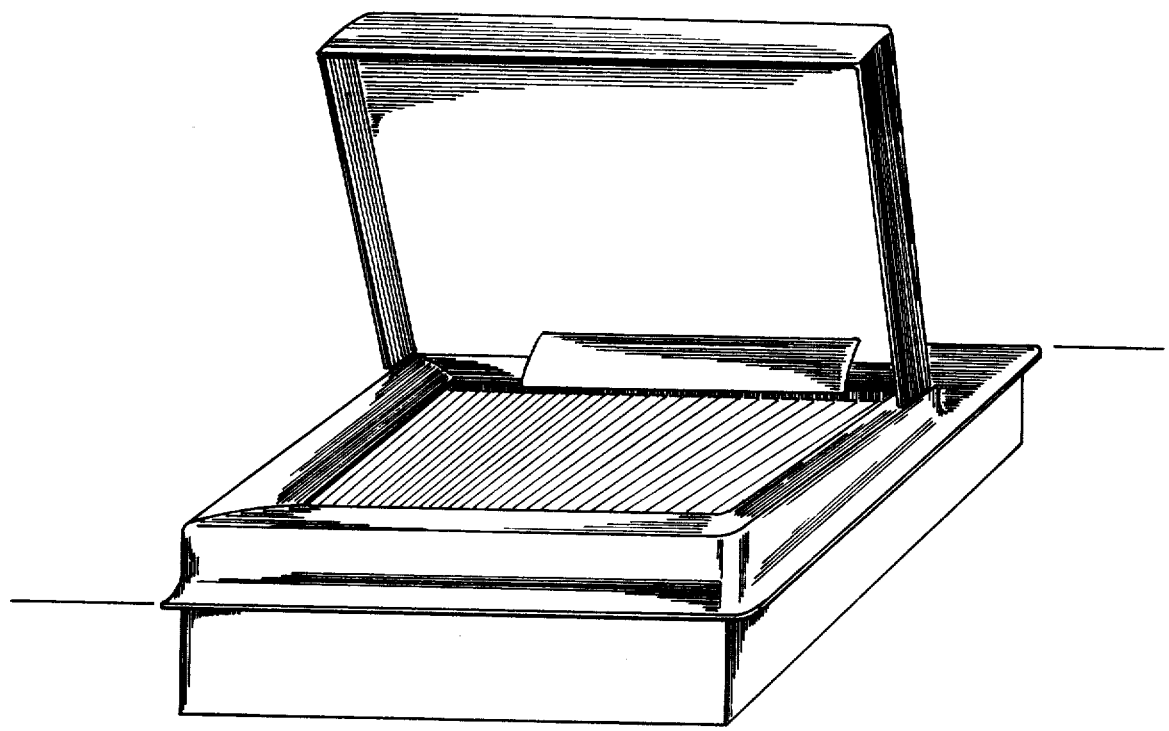
FIG. 1 is a perspective of the water closet illustrating its low profile and easy entrance and exit by the usual household pet. It is designed in an attractive manner which is compatible to the bathroom or laundry room where the unit is most likely to be installed when installation is to be indoors.
Figure 2:
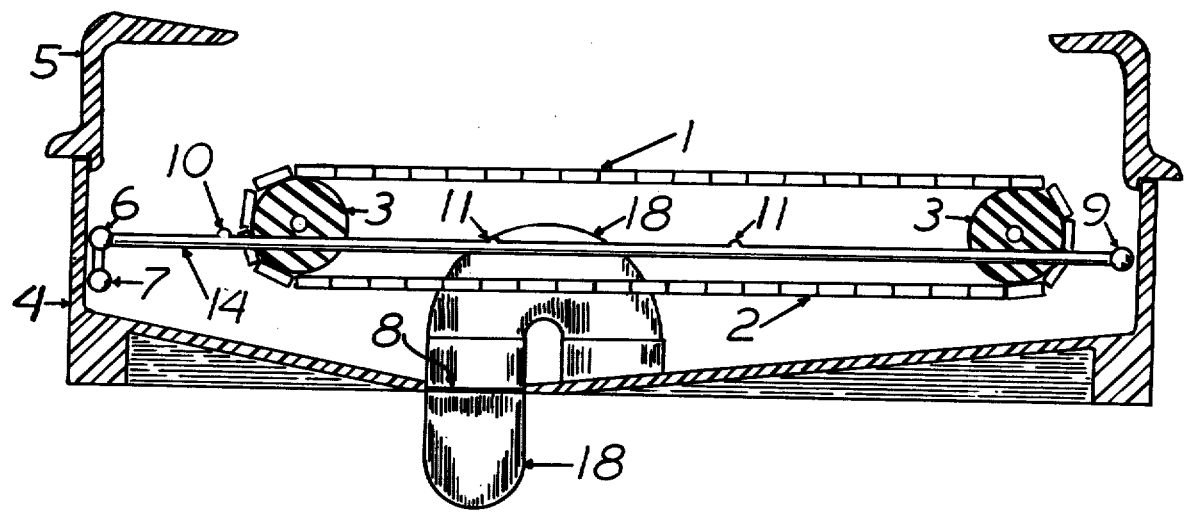
FIG. 2 is a side view in transverse section through a portion of the pet pot excluding the cap and illustrating a conveyor system upon which waste will be deposited by the pet and when rotated physically, moves the waste to the floor of the bowl where it may be flushed into a drain at the lower most point of the bowl floor, then through an s-trap which has been designed into the unit and finally out into a connecting drain which leads to the sewer or septic system.
Figure 3:
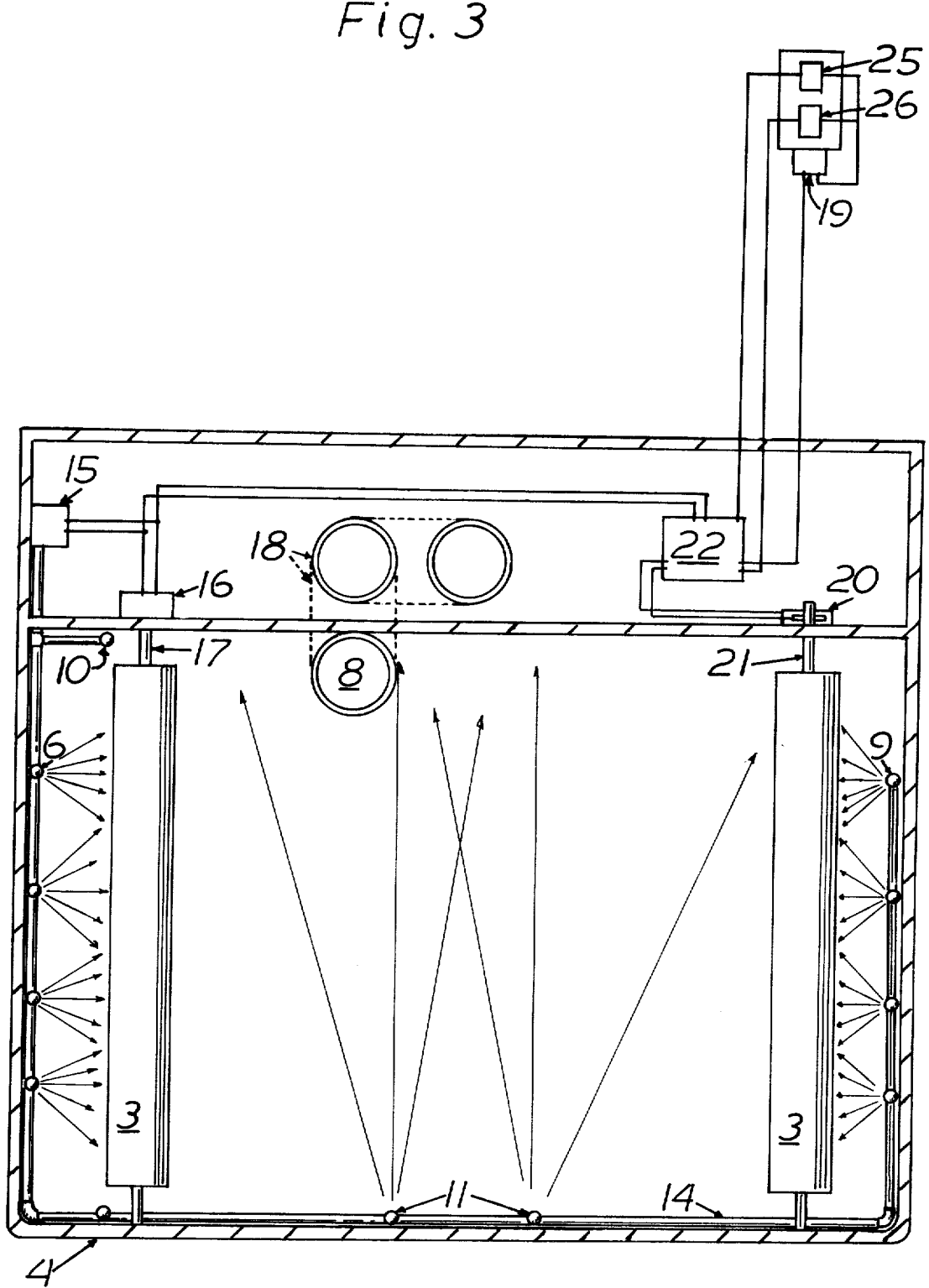
FIG. 3 is a top view of the invention excluding the cap and endless belt. This illustrates the extensive coverage accomplished throughout the flushing cycle. It further illustrates the attached electrical component area which is watertite, and the electrical diagram illustrating the remotely located wall switch, and the simplicity of circuitry.
Figure 4:
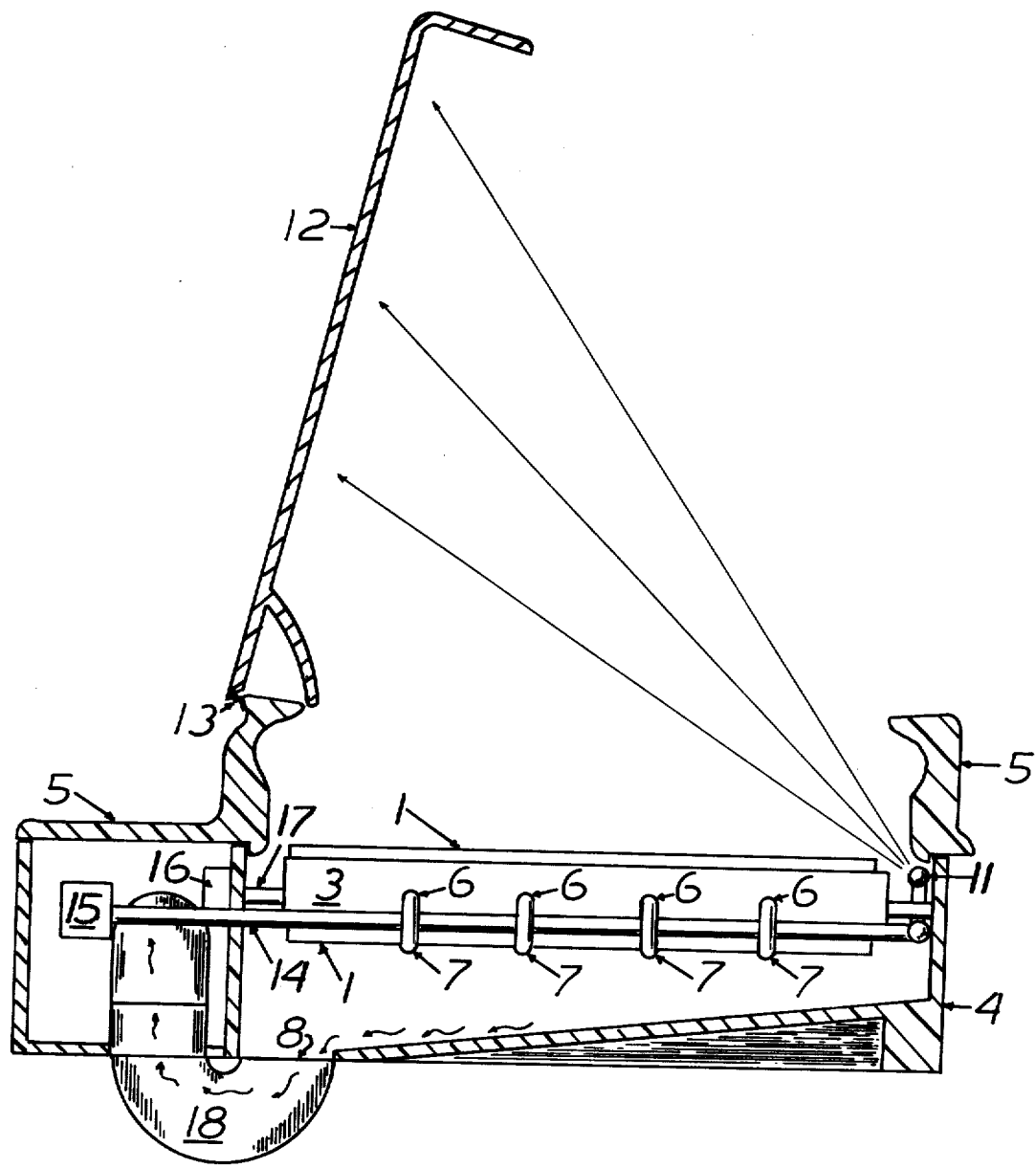
FIG. 4 illustrates an end view of the flushing of the backsplash and the flow of waste into the specially designed s-trap.

Referring now to the drawings in detail, it will be seen that the embodiment of the invention which has been illustrated comprises a conveyor 1 assembled from a quantity of self-mating, interlocking aluminum extrusions called slats 2. The slats on some production units may be coated with a synthetic material to reduce reflection of waste at time of deposit.

The conveyor revolves around two soft rubber rollers 3, supported within the framework of a bowl 4 which will be manufactured from injected molded plastic or fiberglass. The waste deposited by the pet on the conveyor is then moved through the opening on the left as the rollers turn in a counterclockwise direction. The waste will then fall to the floor of the bowl 4. When installed, the bowl will nestle below the floor in such a way as to place the uppermost edge of its walls even with the level of the floor. The bowl will then be covered with a decorative crown 5 manufactured from injection molded plastic or fiberglass with color to match existing fixtures or appliances in the room where the unit is to be installed if installation is to be made inside.

Water nozzles 6 provide the first wash to the waste laden conveyor slats 2, and will remove the bulk of the waste material at this point. The nozzles 7, will act to clean the floor of the bowl and serve to push the waste toward and into the drain 8. The nozzles 9 act as a secondary rinse to the slats and further aid in the cleaning of the bowl floor. The nozzles 10 act to flush the lip of the crown 5 on the end through which waste pass when the conveyor revolves. The nozzles 11 act to wash off the backsplash 12 completing the comprehensive flush cycle. The backsplash 12 is secured to the crown 5 by a pair of hinges 13.

The nozzles of the flushing system 6, 7, 9, 10, and 11 receive their water supply through a network of PVC tubes 14 which has its origin at a constant pressure valve 15 that is electrically activated.

The roller 3 is mounted on a rod 17 which is secured in the frame of the bowl on one end and connects with the shaft of a continuous speed motor 16 on the other end. When the motor is activated the rod 17 revolves by action of the motor to turn the conveyor.

An s-trap 18 is designed to provide a low profile installation and retain a level of water in the bowl 4. The s-trap 18 begins beneith the bowl drain 8 and returns to the bowl through the control box taking a 90° turn to return again through the bowl floor where connection may be made with a sewage pipe. The floor of the control box has been elevated one half inch to provide a an extension of the s-trap through the floor of the bowl facilitating the latter sewage hook up.

Standard household current will be reduced at transformer 19. The transformer is remotely located and grounds to the printed circuit timer board 22. Current passes through a normally open wall switch 25 from the transformer 19 to the printed circuit timer board 22. The switch therefore controls the current necessary to produce an automatic flush by the pet.

When the switch 25 is open and the pet moves onto the conveyor, the weight of the pet on the conveyor depresses the roller 3 and the rod 21 which closes the normally open switch 20. The circuitry of the printed circuit timer board 22 is such that the unit cannot complete a circuit to the constant pressure valve 15 or the continuous speed motor 16 when the switch is closed. This insures complete safety for the pet.

When the pet leaves the conveyor switch 20 opens and thus activates the time delay-to-flush mechanism in the printed circuit timer board 22. If switch 20 is closed during the time delay-to-flush cycle the printed circuit timing board resets the time delay-to-flush back to its full cycle. Following the time delay-to-flush cycle the printed circuit timer board completes a circuit to valve 15 causing the flushing system to activate and to the motor 16 causing the conveyor to revolve. If switch 20 is closed during the timed flush cycle by the re-entry of the pet upon the conveyor all systems stop and the printed circuit timer board resets the pet pot to time delay-to-flush. The printed circuit timer board also times the flush cycle. At the completion of the flush cycle the printed circuit timer board 22 causes the unit to reset to the "off" position until switch 20 is again closed by the presence of a pet on the conveyor.

A manual control has been designed to by-pass the time delay-to-flush cycle to permit an instant flush. To initiate the manual flush the normally closed switch 26 which is a wall mounted switch may be open completing a separate circuit path to the printed circuit timer board 22. The time delay-to-flush cycle is by-passed and a circuit completed to the valve 15 and the motor 16. This is also a timed flush cycle and after the cycle is complete the printed circuit timer board resets the pet pot to the "off" position.

It is thought that the operation of the pet pot will be readily apparent from a consideration of the foregoing. Briefly the presence of the pet upon the conveyor at any time results in a disconnection of the current preventing movement of the conveyor or flushing system. After the pet leaves the conveyor, current is sent to a timer which will cause a delay by means of a switch designed into a printed circuit board and following a brief delay activates the motor to revolve the conveyor and the valve to cause the unit to flush.

The foregoing is considered as illustrative only of the principles of the invention. Further, since numerous modifications and changes will readily occur to those skilled in the art, it is not desirable to limit the invention to the exact construction and operation shown and described, and accordingly all suitable modifications and equivalents may be resorted to, falling within the scope of the invention as claimed.

What is claimed and desired to be secured by Letters Patent is:

1. A pet water closet comprising in combination:
 a. a bowl having a decorative crown extending therefrom;
 b. a back splash hingedly connected to said crown an occupying a substantially vertical position when operative as a back splash, while occupying a substantially horizontal position when operative as a cover for said bowl;
 c. an endless belt conveyor, positioned in said bowl, composed of self-mating, interlocking slats;
 d. an s-trap connecting a drain in said bowl with a sewage system; said s-trap assembled into the configuration of the bowl to maintain a predetermined water level in said bowl;
 e. electrical control system including a pet activated switch for activating an automatic flush system; said control system also including a time-delay means for providing a predetermined interval between said switch actuation and said flush system actuation;
 f. said automatic flush system including means for simultaneously causing rotation of said conveyor belt, while activating a valve to permit the introduction of water into said bowl for spraying on said belt; and
 g. a remote switch, manually activated, for causing the by-pass of said time-delay means, and immediate actuation of said automatic flush system.

2. A pet water closet as claimed in claim 1 wherein said electrical system includes switch and control means activated by a pet remounting the conveyor belt during the time-delay cycle or flushing cycle, said switch and control means causing a cessation of the interrupted cycle and the resetting of said cycles to restart when the pet again dismounts the conveyor belt.

* * * * *